United States Patent [19]

Nichols et al.

[11] 3,710,549
[45] Jan. 16, 1973

[54] FUEL TANK INERTING SYSTEM

[75] Inventors: Richard A. Nichols, Santa Ana; Jack M. Ulanovsky, Newport Beach, both of Calif.

[73] Assignee: Parker-Hannifin Corporation, Cleveland, Ohio

[22] Filed: Jan. 29, 1971

[21] Appl. No.: 110,862

[52] U.S. Cl. .................. 55/160, 55/196, 220/88 B, 261/36 R, 261/77, 261/DIG. 75
[51] Int. Cl. ............................................. B01d 19/00
[58] Field of Search ........ 55/18, 21, 47, 53, 160, 182, 55/196; 220/88; 261/77, 121

[56] References Cited

UNITED STATES PATENTS

| | | | |
|---|---|---|---|
| 2,764,873 | 10/1956 | Mooryaart | 62/1 |
| 2,912,830 | 11/1959 | Coldren et al. | 62/50 |
| 3,302,418 | 2/1967 | Walter | 62/52 |
| 3,358,425 | 12/1967 | Burnham, Sr. | 55/193 |
| 3,481,113 | 12/1969 | Burnham, Sr. | 55/41 |
| 3,229,446 | 1/1966 | Sebastian et al. | 55/53 |
| 3,590,559 | 7/1971 | Bragg et al. | 55/160 |

*Primary Examiner*—Samih N. Zaharna
*Assistant Examiner*—R. W. Burks
*Attorney*—John N. Wolfram

[57] ABSTRACT

A system for maintaining the oxygen content in the fuel vapor space of an aircraft fuel tank at less than 10 percent by volume, such system including an aspirating type mixing nozzle that draws an inert gaseous mixture from the tank vapor space and mixes it with liquid fuel being supplied to the tank whereby said inert gaseous mixture scrubs dissolved oxygen from the fuel and returns to the vapor space with the scrubbed oxygen therein. The tank includes a vent means for venting excess gasses from the vapor space to the tank exterior as the tank fills with fuel and also includes means for further scrubbing of oxygen from the fuel during climb of the aircraft and for pressurizing the tank with inert gas during descent while excluding air from the tank.

11 Claims, 3 Drawing Figures

PATENTED JAN 16 1973

3,710,549

INVENTORS.
RICHARD A. NICHOLS
JACK M. ULANOVSKY

John N. Wolfram
ATTORNEY

FUEL TANK INERTING SYSTEM

BACKGROUND OF THE INVENTION

It is known that flame and explosion cannot propagate in fuel tanks when the oxygen content of the fuel vapor within the tank is less than 10 percent. Heretofore it has been proposed to supply inert gas, such as nitrogen, to the vapor space of aircraft fuel tanks to flush air, which contains about 21 percent oxygen, therefrom and thereafter to exclude air from the tanks and admit only nitrogen when it is necessary to increase the pressure within the tank, as when the aircraft descends in altitude, to thus at all times maintain the oxygen content in the vapor space at less than 10 percent.

Liquid fuels typically dissolve gasses including oxygen, from the air in proportion to the gas partial pressures at the air-fuel interface. Therefore, when an aircraft tank is filled from a supply tank on the ground, the incoming fuel will have dissolved therein oxygen in an amount dependent upon ground level atmospheric pressure. When the aircraft ascends, the fuel tank pressure is automatically lowered by venting of the vapor space to atmosphere so that fuel tank pressure is always nearly the same as the ambient air pressure. Such decreased pressure on the fuel results in the fuel becoming supersaturated with oxygen, that is, it has in it more oxygen than it can hold at the decreased pressure. The excess oxygen eventually comes out of solution and rises to the vapor space. Thus, even though provision may have been made for supplying nitrogen to the vapor space to reduce the oxygen content to less than 10 percent while the aircraft is on the ground, the release of oxygen from the fuel during ascent may increase the oxygen content of the vapor space to more than 10 percent unless further provision is made for avoiding such occurrence. One such provision heretofore proposed in U.S. Pat. No. 3,229,446 is to scrub the oxygen from liquid fuel during the fueling operation by discharging pure nitrogen from an external source into the fuel. This requires a considerable quantity of nitrogen. Although part of the resulting mixture of nitrogen and oxygen in inert proportions remains in the tank ullage when filling is completed, a considerable portion of the nitrogen vents overboard during the filling operation, and thus the system disclosed in this patent is costly to utilize.

SUMMARY OF THE INVENTION

The present invention reduces the amount of nitrogen needed to inert an aircraft fuel tank, and hence also the cost, by using the inert gaseous mixture contained in an empty fuel tank that had previously been subjected to an inerting procedure to scrub oxygen from fuel being introduced into the tank during refilling thereof. This is accomplished by means of an aspirator type mixing nozzles that draws the inert gaseous mixture from the tank ullage and mixes it with the incoming liquid fuel to scrub dissolved oxygen therefrom. The scrubbed oxygen mixes with the scrubbing gasses and the new gaseous mixture rises through the liquid fuel to the ullage where part of the same remains and the excess is vented overboard as the tank fills with fuel.

The amount of nitrogen initially provided or contained in the tank ullage when the tank is empty is preferably enough so that the final gaseous mixture in the vapor space will contain less than 10 percent oxygen when the tank is full and the oxygen dissolved in the fuel is in partial pressure equilibrium with the oxygen in the vapor space. However, because additional oxygen will come out of solution when the tank pressure is reduced during climb of the aircraft, it may be desirable or necessary in some applications to introduce additional nitrogen to the tank for further scrubbing of oxygen from the fuel during the climb and to maintain dilution thereof below the 10 percent limit. Also, provision is made for introducing additional nitrogen to the tank for increasing the pressure therein to substantially that of the ambient atmosphere as the aircraft descends and/or as the fuel is consumed. This additional nitrogen will maintain the tank in an inert condition on the ground in readiness for another refueling operation as herein described. The present disclosure diagrammatically indicates mechanisms for introducing such additional nitrogen during climb and descent. A more detailed description of such mechanisms is contained in U.S. Pat. application Ser. No. 711,020, filed Mar. 6, 1968, now U.S. Pat. No. 3,590,559.

DESCRIPTION OF THE INVENTION

Figure 1:
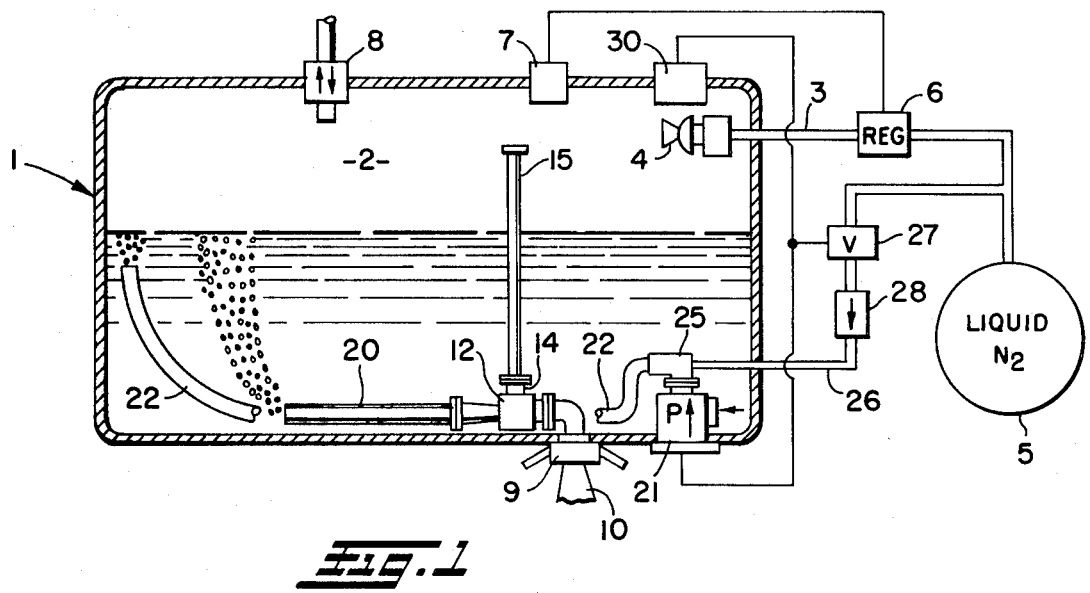
FIG. 1 is a diagrammatic view of an inerting system embodying the present invention.

As shown in the drawing, an aircraft fuel tank 1 having a vapor space or ullage 2 is supplied with an inert gas such as nitrogen through a conduit 3 and a fog nozzle 4 from a dewar 5 containing the inert gas in liquid form. A regulator valve 6 is provided in the conduit 3 to control the flow of the inert gas into the vapor space 2 for pressurizing the same, said regulator valve 6 being opened as by means of a differential pressure sensing device 7 when ambient pressure exceeds tank pressure by a predetermined amount, say, 0.1 psi, as when the aircraft is descending.

The tank 1 is provided with a vent valve 8 for outflow of venting gasses to maintain a predetermined maximum pressure differential between the vapor space 2 and ambient pressure during refueling of the tank on the ground and during climbing of the aircraft.

The portion of a system just described is so arranged that when the aircraft has landed from a flight in which the inerting system has been utilized to pressurize the tank with inert gas, the pressure in the tank may be between say, 0.25 and 0.75 psi above ambient pressure. Should the aircraft be parked for an extended period of time the pressure differential may decrease to a lower value due to temperature changes or other reasons. When the pressure has decreased to a lower value such as 0.125 psi over ambient, the differential pressure device 7 will cause regulator valve 6 to open and inert gas will flow into the tank 1 to bring the tank pressure up to 0.25 psi above ambient pressure and the valve 6 will then close.

Figure 2:
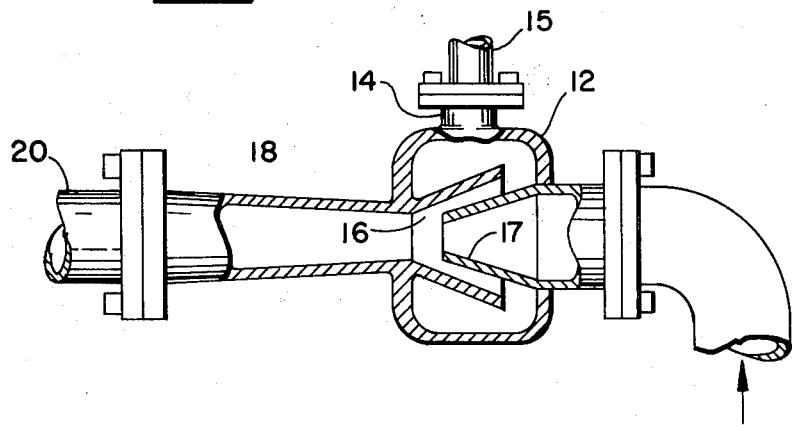
FIGS. 2 and 3 are cross section views respectively of aspirator type and ejector type nozzles utilized in the invention.
Figure 3:
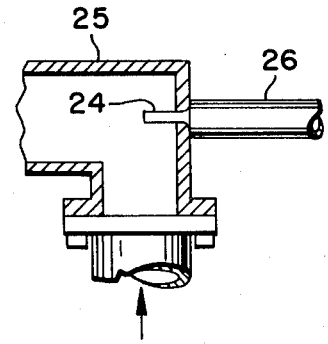

The tank 1 has a fuel inlet valve 9 to which a fueling nozzle 10 is adapted to be coupled for refueling the tank. When the tank 1 is being refueled the incoming fuel flows from nozzle 10 through an aspirator 12, which typically may be shown in FIG. 2. Aspirator 12 has a suction port 14 to which a tube 15 is connected which opens near the upper wall of the tank 1 whereby the negative pressure at the throat 16 of the Venturi nozzle 17 will draw in the inert mixture of nitrogen, oxygen and fuel vapor from space 2 for mixing with the fuel and for flow through the recovery section 18 of the aspirator 12 and through the elongated tube 20 wherein the liquid fuel-inert gaseous mixture has turbulent flow to induce further fuel mixing and liberation of dissolved oxygen from the fuel, such liberated oxygen being absorbed into the inert gaseous mixture that has been drawn from space 2. The outlet of the elongated tube 20 is preferably at the bottom of the tank so as to be submerged in the fuel during most of the fueling operation. The new mixture of inert gasses and oxygen liberated from the incoming fuel bubbles through the fuel and enters vapor space 2 and a portion of the same is vented to the atmosphere through the vent valve 8 as the volume of the vapor space 2 decreases and the pressure therein tends to increase.

In this way, the nitrogen contained in the ullage of the empty tank is utilized for removing or scrubbing oxygen from incoming fuel so that either it will be unnecessary to further remove oxygen from the fuel as the aircraft climbs or a smaller quantity of nitrogen may be used for this purpose.

For further removing oxygen from the fuel during the climb of the aircraft, a recirculating pump 21 of low pressure drop, high volume type recirculates the fuel in the tank 1 through a scrubbing tube 22, inert gas such as nitrogen being injected by nozzle 24 into the fuel elbow 25 on the outlet side of the pump 21. The fuel in the tank is thus scrubbed and decreased in oxygen content as the fuel-nitrogen mixture is recirculated by the pump 21 through the elongated scrubbing tube 22 wherein the fuel-nitrogen mixture has turbulent flow to induce thorough mixing and scrubbing of the fuel. The liberated oxygen and the nitrogen, which is now a gas, rise to the vapor space where a portion thereof is vented to atmosphere through vent valve 8 as ambient pressure decreases. The inert gas supply line 26 has a regulator valve 27 therein to desirably control the pressure of the gas when injected into the fuel elbow 25, and has a check valve 28 therein to prevent fuel from entering the nitrogen system.

A suitable device 30 is connected to valve 27 and pump P to electrically initiate operation thereof at selected intervals of tank pressure decrease or altitude increase and to deactivate the same after a suitable time interval. The tube 22 preferably has its outlet near the surface of the fuel in tank 1 when the tank is nearly filled and at the end of the tank opposite the end where pump 21 is located so that substantially all of the fuel may be circulated through the scrubbing tube 22.

Although not shown herein, the level to which the tank is filled will be controlled in well-known manner by the provision of a level control valve which closes the fuel inlet valve 9 when the tank 1 has been filled to the desired level. During flight, as when the aircraft is climbing, the ambient pressure decreases and when the fuel tank pressure exceeds ambient pressure by more than say, 0.75 psi, the vent valve 8 will open to vent the fuel tank until the pressure has dropped to within 0.75 psi of ambient, at which time the vent valve 8 will close.

At cruising altitude the vent valve 8 will remain closed and inert gas will be admitted through nozzle 4 to compensate for fuel use.

As fuel is used during cruise at level altitude or as ambient pressure rises during descent, the fuel tank pressure tends to become lower than ambient pressure whereby valve 6 is additionally opened to permit a relatively large flow of inert gas to develop a pressure in the vapor space 2 sufficient to prevent vent valve 8 opening in a direction that would admit ambient air into tank 1 during normal operation.

As is evident from the foregoing, by utilizing the inert gas contained within vapor space 2 through the use of aspirator mixing nozzle 12 when the tank is being refueled, a lesser overall amount of inert gas is used in the total operation of maintaining the tank in inerted condition during refueling on the ground, during flight, and when the aircraft is again parked on the ground awaiting a subsequent refueling operation.

Although the use of elongated tubes 20 and 22 may be utilized as herein described, such tubes are not essential in all applications of aspirator nozzle 12 for utilizing inert gas from vapor space 2 during a tank refilling operation. Thus, in some applications of aspirator nozzle 12, tube 20 may be of different form or may be dispensed with entirely. In the latter case, nozzle 12 may discharge directly into the tank, either above or below the level of liquid fuel therein.

We, therefore, particularly point out and distinctly claim as invention:

1. A fuel tank inerting system comprising a fuel tank having a vapor space containing inert gas, a separate supply of inert gas communicating with the vapor space in the tank, mixing means located within said tank having an inlet for liquid fuel containing dissolved oxygen therein and an outlet that discharges the fuel into the tank; and means for conducting said inert gas to said mixing means for mixing with the fuel to scrub oxygen therefrom.

2. The system of claim 1 wherein said mixing means comprises an aspirator having a suction port to which said conducting means is connected.

3. The system of claim 1 wherein said outlet is at the bottom of said tank.

4. The system of claim 1 wherein said mixing means includes an elongated tube on the outlet side thereof in which continued mixing occurs as the fuel-inert gas mixture flows through the tube into the tank.

5. A fuel tank inerting system comprising a fuel tank having a vapor space containing inert gas, a separate supply of inert gas communicating with the vapor space in the tank, and having a fueling port to which fuel is supplied into said tank; an aspirator within the tank having an inlet port communicating with the fueling port, an outlet port in the tank, and a suction port communicating with said vapor space thus to mix inert gas from the vapor space with the incoming fuel as it flows through said aspirator to scrub oxygen from the fuel.

6. The inerting system of claim 5 in which the tank has a means for venting excess gases in said vapor space to the tank exterior as the tank fills with fuel.

7. The inerting system of claim 6 wherein said suction port is communicated to the vapor space by way of a conduit having an inlet in said vapor space and said vent means is located remote from said conduit inlet.

8. A fuel tank inerting system comprising a tank having a refueling port through which liquid fuel containing dissolved oxygen is conducted into said tank; first mixing means for introducing an inert gas for mixing with the incoming fuel to scrub oxygen therefrom as the fuel enters the tank; pump means operative to circulate fuel in said tank; second mixing means for introducing an inert gas for mixing with the fuel as it is discharged from said pump means to further scrub oxygen from the fuel; and vent means in the vapor space of said tank through which gases, including oxygen scrubbed from the fuel during refueling of the tank and during recirculation of the fuel in the tank are vented.

9. The system of claim 8 wherein each of said mixing means has elongated tube means through which the fuel-inert gas mixture flows for continued mixing prior to flow into said tank.

10. The system of claim 8 wherein one of said mixing means comprises an aspirator having an inlet port for fuel, a suction port communicated with an inert gas supply source, and an outlet port through which the fuel-inert gas mixture flows into said tank.

11. The system of claim 10 wherein the vapor space of said tank contains inert gas and constitutes said inert gas supply source.

* * * * *